(12) United States Patent
Nest et al.

(10) Patent No.: US 11,544,802 B2
(45) Date of Patent: Jan. 3, 2023

(54) METHOD, SYSTEM AND APPARATUS FOR CONTROLLING PREPAID DELIVERY OF UTILITIES

(71) Applicant: REDKNEE INC., Mississauga (CA)

(72) Inventors: Frank Nest, Berlin (DE); Andreas Schröder, Berlin (DE)

(73) Assignee: ORTIVA CANADA INC., Mississauga (CA)

( * ) Notice: Subject to any disclaimer, the term of this patent is extended or adjusted under 35 U.S.C. 154(b) by 756 days.

(21) Appl. No.: 15/558,038

(22) PCT Filed: Mar. 13, 2015

(86) PCT No.: PCT/CA2015/000162
§ 371 (c)(1),
(2) Date: Sep. 13, 2017

(87) PCT Pub. No.: WO2016/145505
PCT Pub. Date: Sep. 22, 2016

(65) Prior Publication Data
US 2018/0068397 A1    Mar. 8, 2018

(51) Int. Cl.
*G06Q 50/06* (2012.01)
*G07F 15/00* (2006.01)
(Continued)

(52) U.S. Cl.
CPC .......... *G06Q 50/06* (2013.01); *G06Q 20/102* (2013.01); *G06Q 20/14* (2013.01); *G06Q 20/145* (2013.01);
(Continued)

(58) Field of Classification Search
CPC ........ G06Q 40/12; G06Q 30/04; G06Q 50/06; G06Q 20/145; G06Q 20/28
(Continued)

(56) References Cited

U.S. PATENT DOCUMENTS 8,407,115 B2    3/2013  O'Neil
2011/0225072 A1* 9/2011  Sewell .................. G06Q 50/06
                                                705/30
(Continued)

FOREIGN PATENT DOCUMENTS

WO    2011025397 A2    3/2011

OTHER PUBLICATIONS

Reduan H. Khan, Tanzim F. Aditi, Victor Sreeram, and Herbert H. C. Iu; "A Prepaid Smart Metering Scheme Based on WiMAX Prepaid Accounting Model"; Published Online Aug. 2010; Smart Grid and Renewable Energy, 2010, 1, 63-69. (Year: 2010).*
"World-Leading Prepayment Systems Put Itron At Forefront of Energy Use in Africa", 2011; metering.com, Metering International Issue—2 | 2011; pp. 74-75. (Year: 2011).*
(Continued)

*Primary Examiner* — Shannon S Campbell
*Assistant Examiner* — Freda A Nelson
(74) *Attorney, Agent, or Firm* — Perry + Currier

(57) ABSTRACT

A system for controlling prepaid delivery of utilities includes a utility meter with a cutoff device for enabling or disabling delivery of a utility; and a server connected to the utility meter via a network. The utility meter receives a usage limit from the server, measures usage of the utility by the load, and when the usage limit is exceeded, activates the cutoff device. The utility meter transmits the measured usage to the server at configurable intervals. The server maintains an account balance associated with the load, receives the measured usage from the utility meter, and decrements the account balance based on the measured usage. When the account balance is exhausted, the server sends a command to activate the cutoff device to the utility meter. Otherwise, the server generates a further usage limit based on the account balance, and sends the further usage limit to the utility meter.

18 Claims, 5 Drawing Sheets

(51) Int. Cl.
*G07F 15/12* (2006.01)
*G06Q 20/10* (2012.01)
*G06Q 20/14* (2012.01)
*G06Q 30/04* (2012.01)
*G06Q 20/28* (2012.01)

(52) U.S. Cl.
CPC ........... *G06Q 30/04* (2013.01); *G07F 15/003* (2013.01); *G07F 15/12* (2013.01); *G06Q 20/28* (2013.01)

(58) Field of Classification Search
USPC .............................................. 705/30, 34, 412
See application file for complete search history.

(56) References Cited

U.S. PATENT DOCUMENTS

| | | | | |
|---|---|---|---|---|
| 2012/0119922 | A1* | 5/2012 | O'Neil | G06Q 30/04 340/870.02 |
| 2012/0317005 | A1* | 12/2012 | Hutson | G07F 15/06 705/34 |
| 2014/0077968 | A1* | 3/2014 | Alberth, Jr. | G06Q 30/0202 340/870.02 |

OTHER PUBLICATIONS

Wimberly, Jamie, "Prepay Energy and Enhanced Transactions", Nov. 2014, DeFG, 28 pages. (Year: 2014).*
Eliel Keelson, Kwame Osei Boateng, and I. Ghansah; "Low Cost Early Adoption Procedures for Implementing Smart Prepaid Metering Systems in African Developing Countries", Feb. 2015; Journal of Multidisciplinary Engineering Science and Technology(JMEST) ISSN: 3159-0040; vol. 2, Issue 2; pp. 240-250 (Year: 2014).*
"Making the Switch to Prepaid Electricity", Posted on Dec. 28, 2014 by Smart Prepaid Electric, smartprepaidelectric.com, 2 pgs. (Year: 2014).*
"What is Prepaid Electricity?", Posted on Feb. 28, 2015 by Smart Prepaid Electric, smartprepaidelectric.com, 2 pgs. (Year: 2015).*
Villarreal, Chris, "A Review of Pre-Pay Programs for Electricity Service", Jul. 26, 2012, Dkt. No. 13-0498 (Reopening) Response Exhibit 2.0, Policy and Planning Division Policy Paper, 27 pages (Year: 2012).*
International Preliminary Report on Patentability dated May 15, 2017 for PCT International Patent Application No. PCT/CA2015/000162.
International Search Report dated Nov. 5, 2015 for International Application No. PCT/CA2015/000162.
Written Opinion dated Nov. 5, 2015 for International Application No. PCT/CA2015/000162.

* cited by examiner

US 11,544,802 B2

METHOD, SYSTEM AND APPARATUS FOR CONTROLLING PREPAID DELIVERY OF UTILITIES

FIELD

The specification relates generally to prepaid utility services, and specifically to a method, system and apparatus for controlling prepaid delivery of utility services.

BACKGROUND

Utilities (such as water, electrical supply and the like) are generally metered at the location of their use. Payment for utility usage may be postpaid, in which consumers pay at regular intervals (e.g. monthly) for the previous period's usage. Payment may also be prepaid, where funds must be provided to the utility supplier before usage begins.

In prepaid utility delivery systems, delivery of the utility may be interrupted upon exhaustion of the prepaid balance. In some implementations, the balance is tracked by the meter itself. However, this requires that the meter be capable of financial transactions, and also significantly increases the cost and time required to alter billing rates and tariffs, as each meter must be updated individually.

Some prepaid delivery systems rely on a network-based component instead of the meter itself to implement charging and delivery control. However, such network-based solutions are vulnerable to network congestion or failure.

BRIEF DESCRIPTIONS OF THE DRAWINGS

Embodiments are described with reference to the following figures, in which.

DETAILED DESCRIPTION OF THE EMBODIMENTS

Figure 1:
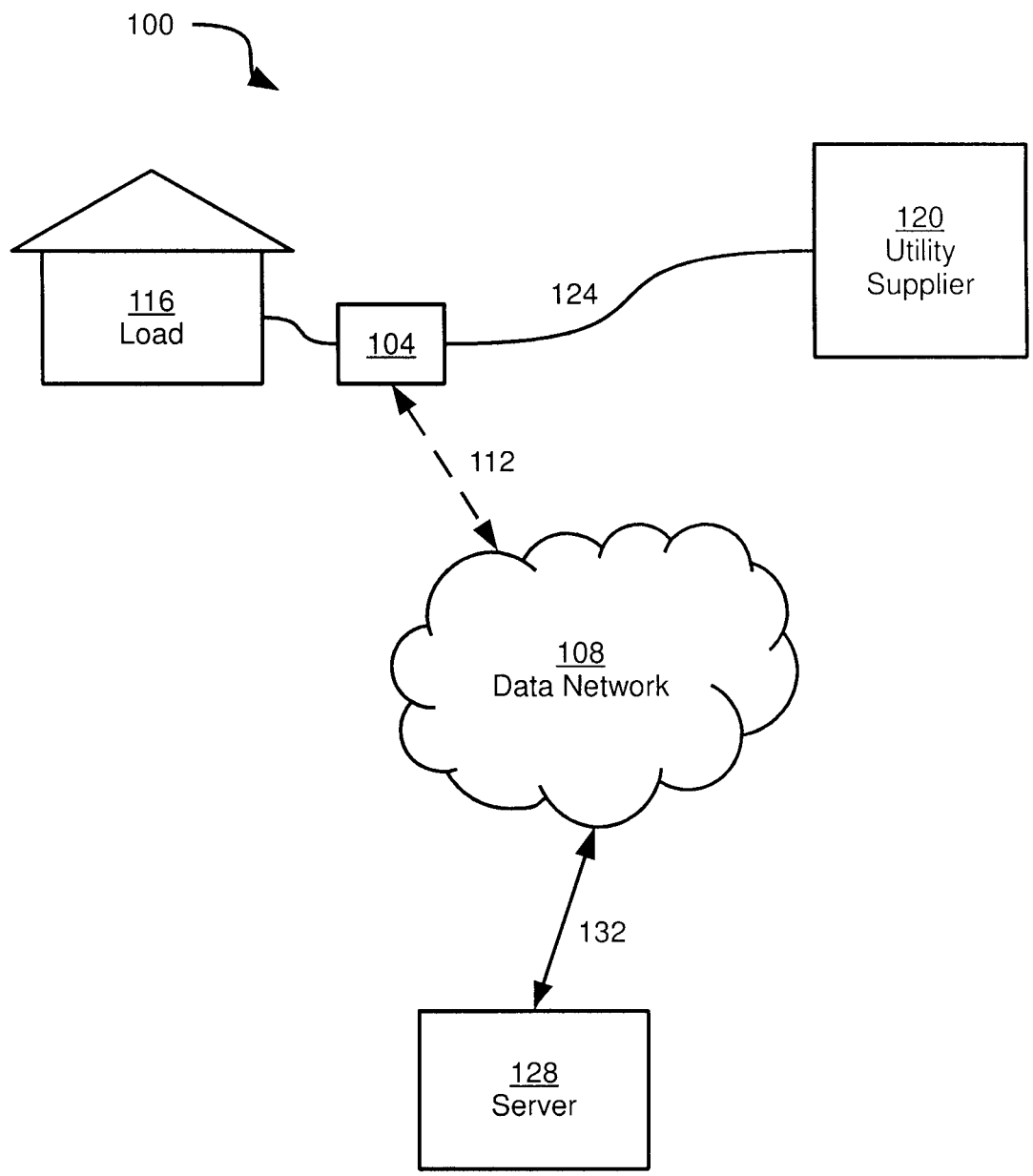
FIG. 1 depicts a system for controlling the prepaid delivery of a utility, according to a non-limiting embodiment.

FIG. 1 depicts a system 100 for controlling the prepaid delivery of a utility. System 100 includes a utility meter 104 connected to a data network 108 via a link 112. The data network 108 can be any one of, or any combination of, a local area network (LAN) or a wide area network (WAN) such as the Internet, mobile networks (GSM, 3G, and the like), or any other suitable network (e.g. powerline, M-Bus and the like). Network 108 can be wired, wireless, or a combination of wired and wireless networks. Link 112 can also be wired, wireless or a combination thereof.

System 100 also includes a load 116 and a utility supplier 120 connected to each other via a utility conduit 124. Utility supplier 120 delivers a utility to load 116 via conduit 124. The utility can be any of a wide variety of utilities, including electricity supply, water supply and the like. The nature of utility supplier 120 and conduit 124 therefore depend on the nature of the utility in any particular implementation.

Load 116 is, in general, a device or collection of devices that consumes the utility supplied via conduit 124. Thus, in an implementation where the utility is electricity, load 116 may include a house or other building associated with a customer of utility supplier 120. The house can contain any number of devices that consume electricity (e.g. refrigerator, computer, lights, and the like) supplied via conduit 124. Those devices are collectively referred to as load 116. Load 116 need not be a single building. For example, load 116 may include the devices consuming the relevant utility at several different buildings (perhaps all associated with a common account).

Utility meter 104, in general, is configured to measure the usage of the utility (e.g. electrical energy) by load 116. In other words, utility meter 104 measures the quantity of the utility delivered to load 116 over conduit 124. As a result, utility meter 104 may lie in the path of conduit 124 between utility supplier 120 and load 116, as shown in FIG. 1. In other embodiments, utility meter 104 may be connected in parallel to conduit 124. Utility meter 104 also includes a cutoff device (not shown) for enabling or disabling the delivery of the utility to load 116 via conduit 124.

It will now be apparent to those skilled in the art that system 100 can include a plurality of loads and a corresponding plurality of utility meters 104. Load 116 and utility meter 104 are shown in FIG. 1 and discussed herein for illustrative purposes, but system 100 is not limited to a single load and a single utility meter. On the contrary, the functionality described herein can be replicated for any number of loads and utility meters.

System 100 also includes a control server 128, also referred to herein as server 128. Server 128 is connected to network 108, for example via a wired link 132. Thus, server 128 can communicate with utility meter 104 via network 108 and links 132 and 112. In some embodiments, utility meter 104 and server 128 may not communicate directly with one another. Instead, one or more intermediate components, such as meter data management systems or meter head end systems, may relay data between server 128 and utility meter 104. For simplicity of illustration, those systems are not discussed in detail herein, and are instead considered as being components of links 112 and 132, as well as network 108. As will be discussed below in greater detail, utility meter 104 and server 128 interact to control the delivery of the utility to load 116 via conduit 124. Specifically, utility meter 104 and server 128 are each configured, under certain conditions, to cause activation of the above-mentioned cutoff device to interrupt the delivery of the utility to load 116. Before further discussion of the actions taken by utility meter 104 and server 128, a brief description of the hardware components of utility meter 104 and server 128 will be provided.

Figure 2:
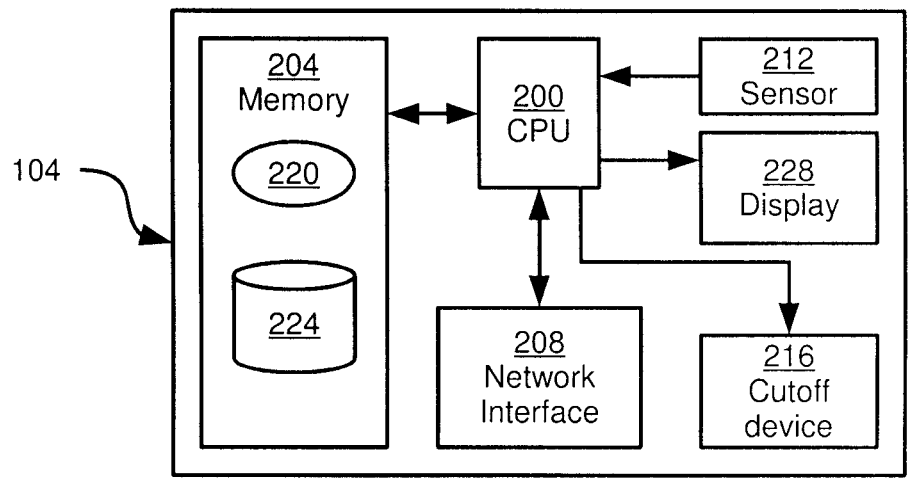
FIG. 2 depicts certain internal components of the utility meter of FIG. 1, according to a non-limiting embodiment.

Referring now to FIG. 2, a schematic diagram of certain internal components of utility meter 104 is provided. Utility meter 104 includes a central processing unit (CPU) 200, also referred to herein as processor 200, interconnected with a memory 204. Processor 200 and memory 204 are generally comprised of one or more integrated circuits (ICs), and can have a variety of structures, as will now occur to those skilled in the art (for example, more than one CPU can be provided).

Memory 204 can be any suitable combination of volatile (e.g. Random Access Memory ("RAM")) and non-volatile (e.g. read only memory ("ROM"), Electrically Erasable Programmable Read Only Memory ("EEPROM"), flash memory, magnetic computer storage device, or optical disc) memory.

Processor 200 is also interconnected with a network interface 208. Network interface 208 includes any necessary hardware components for connecting to network 108. Thus, network interface 208 can include a network interface controller (NIC), one or more radio elements, and the like.

Utility meter 104 also includes a sensor 212 and a cutoff device 216. Sensor 212 transmits data to processor 200 representing quantities of the utility delivered to load 116 via conduit 124. Sensor 212 can therefore include any of a wide variety of sensors, including electro-mechanical sensors (e.g. an electric induction motor for measuring electricity usage, a displacement water meter for measuring water usage, and the like), solid-state sensors, or combinations thereof. Cutoff device 216 includes any suitable components for interrupting the delivery of the utility to load 116 when activated, and permitting the delivery of the utility to load 116 when deactivated. For example, cutoff device 216 can include a valve, an electrical relay, and the like.

Utility meter 104 stores, in memory 204, a plurality of computer-readable programming instructions, executable by processor 200, in the form of an application 220. Also stored in memory 204 is a data repository 224 containing various data for use in controlling the delivery of the utility to load 116. The data contained in repository 224 includes usage data collected via sensor 212, and a usage limit, which will be discussed in further detail below. In general, processor 200 executes the instructions of application 220 to control the other components of utility meter 104 and interact with server 128 to control utility delivery to load 116. In the description below, processor 200 or utility meter 104 more generally are said to be "configured to" or "operated to" perform certain functions. It will be understood that utility meter 104 is so configured via the execution of application 220 by processor 200.

Utility meter 104 can also include an output device, such as a display 228, connected to processor 200. Display 228 can include any suitable one of, or any suitable combination of, flat panel, cathode ray tube (CRT), LCD and LED displays. Display 228 can be connected to utility meter 104 by a communications link; for example, display 228 may be connected to another computing device within a house (e.g. load 116), which in turn is connected to utility meter 104. Utility meter 104 can also include other output devices, such as a speaker (not shown), a printer, and the like. In some embodiments, one or more of the above-mentioned output devices can be omitted. Utility meter 104 can also, in some embodiments, include input devices such as a microphone, a keypad, or any suitable combination thereof. Such input devices are not mandatory, however.

Figure 3:
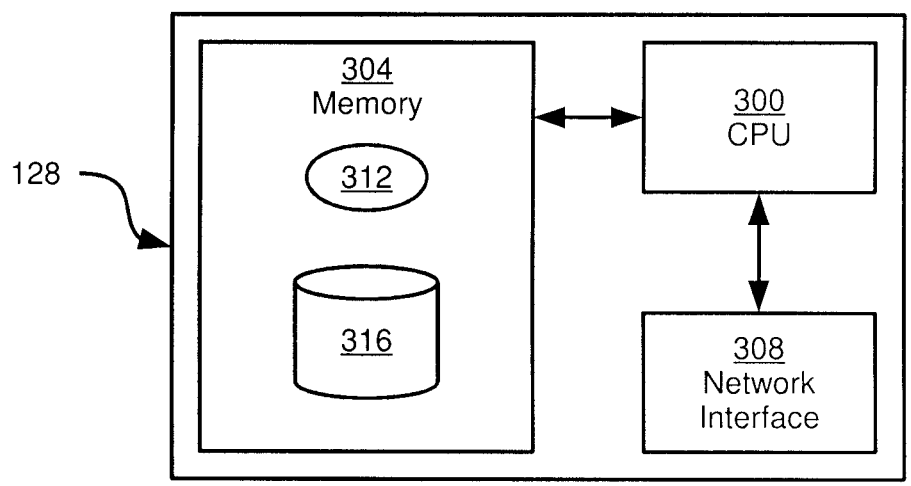
FIG. 3 depicts certain internal components of the server of FIG. 1, according to a non-limiting embodiment.

Referring now to FIG. 3, a schematic diagram of certain internal components of server 128 is provided. Server 128 includes a central processing unit (CPU) 300, also referred to herein as processor 300, interconnected with a memory 304. Processor 300 and memory 304 are generally comprised of one or more integrated circuits (ICs), and can have a variety of structures, as will now occur to those skilled in the art (for example, more than one CPU can be provided; the components of server 128 may also be housed in more than one enclosure, and may also be at different geographical locations).

Memory 304 can be any suitable combination of volatile (e.g. Random Access Memory ("RAM")) and non-volatile (e.g. read only memory ("ROM"), Electrically Erasable Programmable Read Only Memory ("EEPROM"), flash memory, magnetic computer storage device, or optical disc) memory. In the present example, memory 304 includes both volatile and non-volatile storage.

Processor 300 is also interconnected with a network interface 308 that allows server 128 to communicate with other devices, such as utility meter 104, via network 108. Network interface 308 this includes any hardware necessary to communicate over network 108. For example, network interface 308 can include one or more network interface controllers (NICs).

Server 128 can also include input devices (not shown) interconnected with processor 300, such as a keyboard and mouse, as well as output devices (not shown) interconnected with processor 300, such as a display. In some embodiments, the input and output devices can be connected to processor 300 via network interface 308 and another computing device. In other words, input and output devices can be local to server 128, or remote. Remote input and output devices may be connected to smartphones or other computing devices, and may communicate with server 128 via network interface 308. In some embodiments, such other computing devices may make use of an application programming interface (API) provided by server 128 in order to interact with server 128.

Memory 304 stores a plurality of computer-readable programming instructions, executable by processor 300, in the form of various applications, including an application 312. Memory 304 also stores a database 316 containing various types of data for use during the execution of application 312 for controlling the delivery of the utility to load 116. Processor 300 can execute the instructions of application 312 in order to perform various operations defined within the instructions. In the description below, processor 300 or server 128 more generally are said to be "configured to" or "operated to" perform certain functions. It will be understood that server 128 is so configured via the execution of application 312 by processor 300.

As mentioned earlier, utility meter 104 and server 128 are each configured to perform various actions and interact with each other in certain ways to control the delivery of the utility (e.g. electricity, water, etc.) to load 116. The functionality of utility meter 104 and server 128 will be described in greater detail below, with reference to FIGS. 4 and 5.

Figure 4:
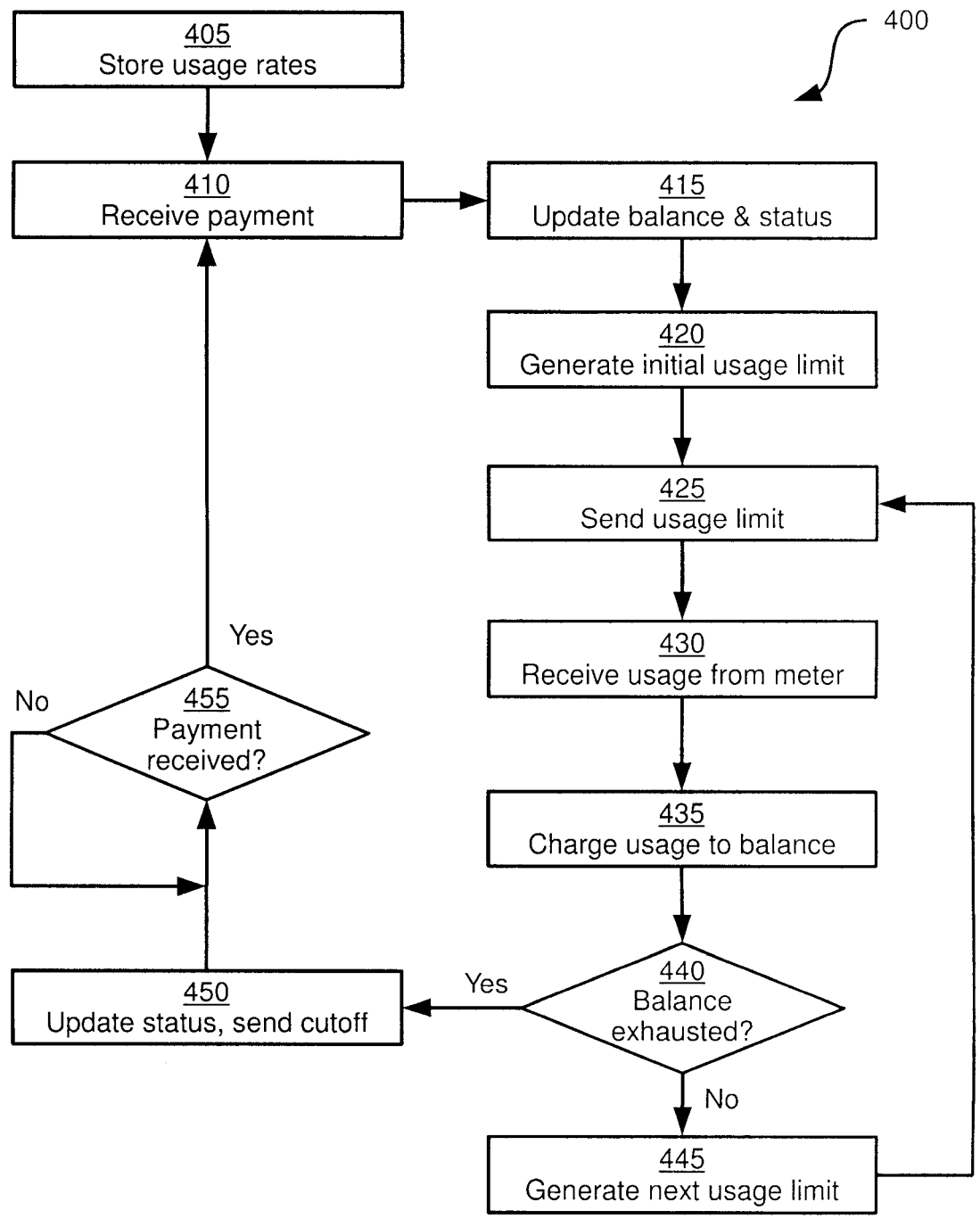
FIG. 4 depicts a method of controlling the delivery of a utility performed at the server of FIG. 1, according to a non-limiting embodiment.

Referring to FIG. 4, a method 400 of controlling delivery of the utility to load 116 is illustrated. Method 400 is performed by server 128. More specifically, processor 300 of server 128 executes the instructions of application 312, which cause processor 300 to perform method 400 (in conjunction with the other components of server 128).

Beginning at block 405, server 128 is configured to store usage rates in memory 304, particularly in repository 316. The usage rates stored at block 405 can take any suitable form. In general, the usage rates will be employed (later in the performance of method 400) to determine a monetary cost corresponding to usage data received at server 128 from utility meter 104. Thus, the usage rates define a cost, in any suitable unit (e.g. monetary, or otherwise), corresponding to a specified quantity of the utility delivered over conduit 124. A single usage rate may be maintained in memory 304 for all loads (including load 116), or individual loads (or groups of loads) may be assigned distinct usage rates in memory 304. Table 1, below, presents an example of the usage rates stored in memory 304.

TABLE 1

Example Usage Rates

| Load Identifier | Time period | Rate |
|---|---|---|
| 116 | 21:01-07:00 | $0.09/kWh |
| | 07:01-21:00 | $0.14/kWh |

As seen above, memory 304 stores rates associated specifically with load 116 (that is, corresponding to load 116. The rates specify a first price per unit of utility (electricity, in the present example) for a first portion of each day, and a second price per unit of utility for a second portion of each day. A wide variety of other rating schemes may also be stored in memory 304, whether in combination with the above or instead of the above. For example, a flat rate may be applied to any utility usage during certain time periods. In another example, prices per unit (e.g. a kilowatt-hour as in Table 1) may vary based on the total quantity consumed rather than on the time of day. In further examples, discount structures and other charging parameters may be employed.

At block 410, server 128 is configured to receive a payment associated with load 116. The payment can be received by any conventional means (e.g. from a computing device operated by a financial institution, by utility meter 104 itself, if utility meter includes payment input devices). In general, the payment is received at server 128 as a message including a monetary balance defined by the payment.

At block 415, responsive to receiving the payment, server 128 is configured to update a balance in memory 304 associated with load 116, as well as a status associated with load 116 (and by extension, associated with utility meter 104). The above-mentioned balance is the monetary balance of an account corresponding to load 116, and defines the total cost of the utility (e.g. electricity) that can be delivered to load 116 before further payment is required. In other words, system 100 is a prepaid system, in which funds must be provided to server 128 before the delivery of the utility to load 116 is permitted.

The balance and status can be stored in memory 304 in any suitable form. Table 2, below, illustrates an example balance and status stored in memory 304 (e.g. in repository 316).

TABLE 2

Example Balance and Status

| Load Identifier | Balance | Status | Reserved Balance |
|---|---|---|---|
| 116 | $30.00 | Connected | |

As seen in Table 2, a record is stored in memory 304 containing an identifier of load 116, a corresponding account balance (which may result entirely from the payment received at block 410, or from that payment and earlier payments received in connection with previous performances of block 410), and a corresponding status. The status is an indication of whether the delivery of the utility to load 116 is enabled or disabled. As will be seen below, the status indicates the operation of cutoff device 216 at utility meter 104. The status of "connected" shown in Table 2 indicates that delivery of the utility to load 116 is enabled (that is, cutoff device 216 is deactivated). A wide variety of other indicators may be employed in the status field instead of "connected" and "disconnected". For example, binary indicators (e.g. 1 for delivery enabled, 0 for delivery disabled) may be employed. Additional status indicators beyond the above binary examples may also be employed, such as "limited" when utility meter 104 has been restricted in some way (e.g. cutoff device 216 is activated at certain times of day). As will become apparent in the discussion below, however, the status need not be explicitly indicated in memory 304

Table 2 also includes a reserved balance field, which is currently empty. In some embodiments, the reserved balance field is not employed and may therefore be omitted. In embodiments in which the reserved balance field is employed, that field is populated at a later stage of method 400, as will be described below.

Having received payment and updated the balance and status in memory 304 corresponding to load 116, server 128 is configured at block 420 to generate an initial usage limit based on the balance updated at block 415, and on the rates stored at block 405. The initial limit can be generated in a variety of ways. In general, the usage limit defines a quantity of the utility (e.g. kilowatt-hours for electricity, cubic metre for water, or the like). Any quantity of the utility in system 100 has a corresponding monetary value (i.e. cost), defined by the rates stored at block 405, examples of which are shown in Table 1. Thus, server 128 is configured to generate an initial usage limit with a corresponding cost that does not exceed the account balance updated at block 415.

In some embodiments, server 128 generates an initial usage limit with a corresponding cost that consumes substantially all of the account balance set at block 415. For example, the initial usage limit can be generated by server 128 by dividing the account balance by the rate corresponding to load 116. When multiple rates exist (as in Table 1), server 128 can compute average rate for use at block 420, or select one of the multiple rates (e.g. the lowest rate, the highest rate, or the like). As a further example, a weighted average of rates can be applied based on usage history at load 116 stored in memory 304, if such history is available (e.g. if most of the usage at load 116 historically occurs between 9 pm and 7 am each day, then the rate corresponding to that time period may be more heavily weighted in the average). The initial usage limit may also be set to consume additional amounts beyond the account balance set at block 415. For example, the initial usage limit may also account for additional credits, balances from related accounts (e.g. a related account for a different utility), and the like.

In other embodiments, server 128 generates an initial usage limit with a corresponding cost that consumes only a portion of the account balance set at block 415. The size of the portion is not particularly limited, and can be determined at least in part by the number of other services, if any, that are charged to the account balance associated with load 116. For example, if a single account balance is employed for prepaid service of three utilities to the same building or plurality of buildings (with those building therefore representing a load for each utility), then server 128 can be configured to generate an initial usage limit at block 420 with a cost equivalent to one third of the account balance.

In the embodiments in which the initial usage limit consumes only a portion of the account balance, at block 420 server 128 can also update the reserved balance field in Table 2 to contain an indication of the cost of the initial usage limit. That cost represents an amount that cannot be allocated to usage limits for other utilities (which are managed by other, parallel performances of method 400 that draw on the same account balance).

In the present example performance of method 400, it will be assumed that the initial limit generated at block 420 is generated to have a cost that consumes substantially the entire account balance. Further, it will be assumed for the sake of illustration that server 128 generates the initial usage limit based on the lowest available rate corresponding to load 116. Thus, the initial usage limit is ($30.00/0.09$/kWh=333.3 kWh).

Proceeding to block 425, server 128 is configured to send the initial usage limit to utility meter 104, via network 108. The initial usage limit can be sent according to any suitable communication protocol, or set of protocols. In some embodiments, server 128 can send additional data to utility meter 104 with the initial usage limit. For example, if utility meter 104 is capable of displaying rate information server 128 can send the rates applicable to load 116 for display at utility meter 104. The message, or messages, send at block 425 can also include a connection command—a command to utility meter 104 to deactivate cutoff device 216 and thereby enable delivery of the utility to load 116. The connection command can be omitted when the status of load 116 (as represented in Table 1, for example) is already "connected". In other embodiments, however, the connected command can always be included. The initial usage limit may be stored at server 128, but this step is not necessary for the performance of method 400, and is therefore preferably omitted.

Having send the initial usage limit at block 425, server 128 then receives usage data from utility meter 104 at block 430. The usage data defines a quantity of the utility delivered to load 116 during an identified period of time. Table 3 illustrates example usage data received from utility meter 104.

TABLE 3

Example Usage Data

| Meter Identifier | Time period | Usage (kWh) |
| --- | --- | --- |
| 104 | 08:01-09:00 | 10.4 |
| 104 | 09:01-10:00 | 8.0 |
| 104 | 12:01-13:00 | 7.1 |

In the example of Table 3, utility meter 104 reports usage quantities per hour. A wide variety of other reporting formats are also possible, including per-day or simply a single usage measurement with timestamps indicating the beginning and end of the period corresponding to that single usage measurement. In other embodiments, timestamps may be replaced by sequence numbers or other interval identifiers. In general, the usage data is reported in a form that can be compared to (for example) rating information at server 128 for charging purposes. It is contemplated that although a meter identifier is shown in Table 3, a load identifier can be included or substituted for the meter identifier. In embodiments where a meter identifier is employed, server 128 can store the meter identifier corresponding to load 116 in memory, so as to correctly associate usage data from a given meter with the correct load and account information.

Server 128 can store the usage data in memory 304 in association with an identifier of load 116. In other embodiments, server 128 can store the usage data in volatile memory only, until the charging procedure of block 435 (to be discussed below) is complete, at which time the usage data can be discarded.

Responsive to receiving the usage data at block 430, server 128 is configured at block 435 to charge the usage defined by the usage data to the account balance set at block 415. Server 128 is therefore configured to determine a cost corresponding to the usage data, based on the rates stored at block 405. In the present example, given the rates shown in Table 1 and the usage data shown in Table 3, the cost determined by server 128 is: (10.4+8.0+7.1)kWh*0.14$/kWh=$3.57. The cost determined at block 435 is deducted from the account balance set at block 415. Thus, following the present example performance of block 435, Table 2 would appear as shown below in Table 4:

TABLE 4

Updated Example Balance and Status

| Load Identifier | Balance | Status | Reserved Balance |
| --- | --- | --- | --- |
| 116 | $26.43 | Connected | |

When the reserved balance field is in use, the reserved portion of the account balance is released at block 435 prior to charging. Responsive to decrementing the balance based on the usage data received at block 430 and the rates stored in memory 304, server 128 is configured to determine, at block 440, whether the account balance associated with load 116 is exhausted. The determination at block 440 is a determination of whether the account balance is at or below zero. In other embodiments, the account balance may be considered exhausted if it falls below any other suitable threshold. In still other embodiments, the balance may be considered exhausted if it has expired (e.g. not been updated for a configurable length of time), or the like. In the present example, as seen in Table 4, the account balance is above zero, and the determination is therefore negative. Server 128 therefore proceeds to perform block 445 of method 400.

At block 445, server 128 is configured to generate a further usage limit. The further usage limit can be generated in the same manner as at block 420. Thus, in the present example, the further usage limit has a cost equivalent to substantially the entire account balance. Computing the new usage limit in the same manner as above (selecting the lowest available rate, solely for illustrative purposes), the new usage limit generated at block 445 is therefore 293.7 kWh. Server 128 then proceeds to block 425.

In some embodiments, however, the generation of the further usage limit at block 445 differs from the generation of the initial usage limit. Specifically, in the embodiments (mentioned above) in which the initial usage limit corresponds to only a portion of the account balance, at block 430 server 128 can receive the above-mentioned usage data and also a request from utility meter 104 for a specific further usage limit (that is, a specific quantity of the utility). In such embodiments, generation of the further usage limit at block 445 involves generating a further usage limit that is equal to the limit requested by utility meter 304, if the requested limit can be accommodated by the account balance. When the requested limit cannot be accommodated—that is, when the requested limit has a cost that is greater than the account balance—server 128 generates a further usage limit that is smaller than the requested limit. For example, server 128 can be configured to generate a further usage limit equal to the requested limit when possible, or a further usage limit having a cost equal to the entire remaining account balance when the requested limit has a cost exceeding the account balance. Having generated the further usage limit, server 128 updates the reserved balance field with the cost of the further usage limit, and proceeds to block 425.

Responsive to generation of the further usage limit at block 445, server 128 returns to block 425 and sends the further usage limit. Server 128 then waits for further usage data, upon receipt of which block 430 is repeated (as well as subsequent blocks of method 400).

When the determination at block 440 is affirmative—that is, when the account balance is at or below zero following charging of the usage data at block 435—performance of method 400 proceeds to block 450 instead of block 445. At block 450, server 128 is configured to send a cutoff command to utility meter 104, instructing utility meter 104 to activate cutoff device 216 to interrupt the delivery of the utility to load 116. At block 450, server 128 also updates the status (shown in Tables 2 and 4) to "disconnected" or an equivalent setting. Following the performance of block 450, server 128 awaits receipt of a payment at block 455. When a payment is received, server 128 returns to block 410, as described above. In some embodiments, server 128 need not wait at block 455 to receive a payment. Instead, server 128 can continue to receive usage data from utility meter 104 (block 430), even if the usage data indicates zero usage (due to the activation of cutoff device 216). More generally, the receipt and processing of usage data can be asynchronous with the receipt and processing of payments at server 128. Indeed, a payment may be received at any time without a cutoff message being delivered at block 450. Receipt of a payment simply leads to the generation of a new limit, followed by continued performance of method 400.

Figure 5:
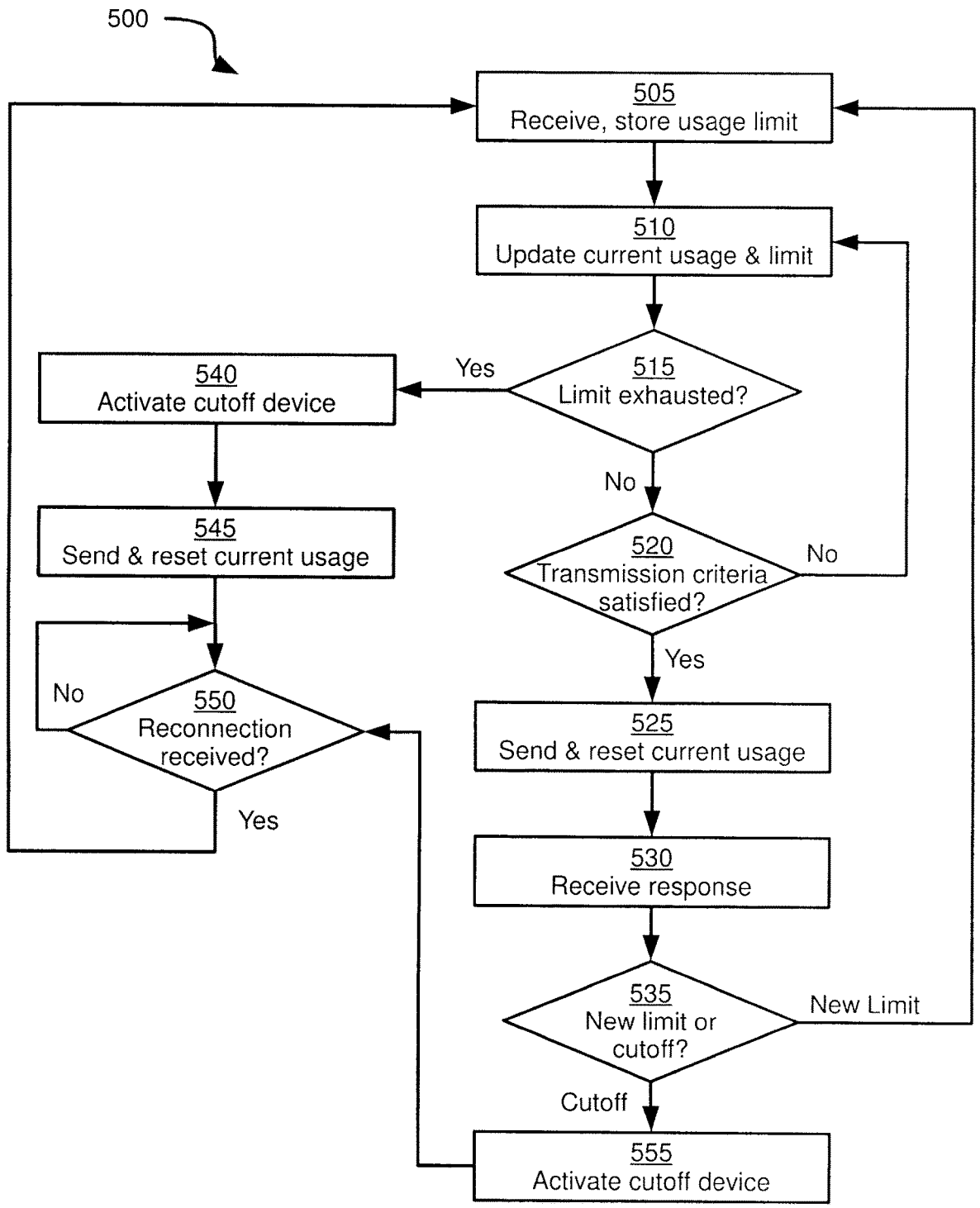
FIG. 5 depicts controlling the delivery of a utility performed at the utility meter of FIG. 1, according to a non-limiting embodiment.

Turning now to FIG. 5, a method 500 of controlling delivery of the utility to load 116 is illustrated. Method 500 is performed by utility meter 104 and, as will be seen below, is performed in conjunction with the performance of method 400 by server 128. More specifically, processor 200 of utility meter 104 executes the instructions of application 220, which cause processor 200 to perform method 500 (in conjunction with the other components of utility meter 104).

At block 505, utility meter 104 is configured to receive and store a usage limit. The usage limit is received at processor 200 via network interface 208, and in turn over network 108 from server 128. The usage limit received at block 505 is the usage limit generated by server 128 at either one of blocks 420 and 445 of method 400. Thus, as noted above, the usage limit specifies a quantity of utility (e.g. a number of kilowatt-hours).

At block 510, utility meter 104 is configured to monitor usage of the utility and update usage data in memory 204 (e.g. in repository 224). Specifically, processor 200 is configured to receive data from sensor 212 indicating quantities of the utility, and to store such quantities in memory 204 in association with timestamp data. For example, usage data can be stored in memory 204 in the format shown in Table 3, above. Also at block 510, utility meter 104 is configured to update the usage limit received at block 505. Thus, whenever a new item of usage data is stored in memory 304 representing a quantity of the utility delivered to load 116, that same quantity is decremented from the usage limit received at block 505.

Taking the initial usage limit generated by server 128 at block 420 (333.3 kWh) and the usage data of Table 3 as an example, following the storage of the usage data of Table 3, the usage limit would be decremented to 307.8 kWh. At block 515, utility meter 104 determines whether the usage limit has been exhausted—that is, whether the usage limit has reached zero or below. In the present example, the determination is negative because the usage limit has not reached zero, and performance of method 500 therefore proceeds to block 520.

At block 520, utility meter 104 determines whether transmission criteria stored in memory 304 are satisfied. In general, the transmission criteria define when utility meter 104 transmits the usage data stored at block 510 to server 128. The transmission criteria can include a wide variety of conditions. For example, the criteria can include a determination as to whether an explicit request for usage data has been received (for example, from the meter data management system mentioned earlier). As a further example, utility meter 104 can be configured to transmit usage data once per hour, or at any other suitable interval of time. In other examples, utility meter 104 can be configured to transmit usage data when the usage limit reaches or falls below a threshold. The threshold can be a fraction of the usage limit received at block 505 (e.g. ten percent), or an absolute quantity of utility (e.g. 5 kWh). Multiple criteria can be employed at block 520 if desired. Another example of a transmission criterion is that server 128 be reachable via network 108. That is, when communications between utility meter 104 and server 128 are interrupted (e.g. due to an outage in all or part of network 108), the determination at block 520 will be negative.

When the determination at block 520 is negative, utility meter 104 continues to gather and store usage data, and to decrement the usage limit. When the determination at block 520 is affirmative, utility meter 104 is configured to perform block 525, at which utility meter 104 transmits the accumulated usage data (which may have been stored through multiple performances of blocks 510-520) to server 128 and resets the usage data. Resetting the usage data can involve discarding any previously stored usage data, or marking previously stored usage data as historical data. More generally, resetting the usage data ensures that the same usage data is not reported to server 128 more than once.

In some embodiments, at block 525 utility meter 104 can also send a request for a specific further usage limit, as described above in connection with method 400.

As will now be apparent, the usage data sent to server 128 at block 525 is received by server 128 at block 430 of method 400. Following such receipt, server 128 performs blocks 435 and 440, and responds to utility meter via either blocks 445 and 425 (when a new limit is provided to utility meter 104), or via block 450 (when a cutoff command is sent to utility meter 104). Utility meter 104 receives a response from server 128 at block 530 of method 500, and at block 535 determines whether the response is a new usage limit (generated by sever 128 at block 445) or a cutoff command (sent by server 128 at block 450).

In some embodiments, server 128 may send no response to the usage data sent at block 525, or server 128 may send a response (such as a simple acknowledgement message) that includes neither a cutoff command or a new limit. In such embodiments, utility meter 104 can simply return to block 510 to monitor and send additional usage data. It is also contemplated that a new limit or cutoff command may be received from server 128 at any time. For example, a new limit may be received from server 128 (perhaps in response to a payment made to server 128) during the performance of block 525. Utility meter 104 is configured, in response to the new limit, to return to block 505. In other words, the performance of method 500 need not follow the flowchart shown in FIG. 5 exactly—certain events may occur asynchronously, and the performance of method 500 can "jump" to the appropriate block to respond to those events. Further, certain portions of method 500 may occur in parallel. For example, utility meter 104 can receive a new limit from server 128 during the performance of block 520. Utility meter 104 can thus perform block 505 while completing the performance of blocks 520 and 525.

In the present example, the response from server 128 is a new usage limit, as the usage data of Table 3 does not consume the entire account balance associated with load 116. Utility meter 104 therefore returns to block 505 and replaces the previous limit with the newly received usage limit. The previous limit can simply be discarded. In some embodiments, the new limit may be specified in the response from server 128 in relation to the previous limit (e.g. a percentage of the previous limit). Thus, after the second performance of block 505, in line with the example performance of method 400 by server 128 discussed above, the usage limit stored at utility meter 104 is 293.7 kWh. Utility meter 104 then resumes performance of method 500 as described above.

When the determination at block 515 is negative—that is, when the most recent usage limit provided by server 128 has been exhausted—utility meter performs block 540 rather than block 520. At block 540, utility meter 104 is configured to activate cutoff device 216, preventing further delivery of the utility to load 116. Utility meter 104 is then configured, at block 545, to send and usage and outstanding usage data, as described earlier in connection with block 525.

At block 550, utility meter 104 is configured to await a reconnection command from server 128. Such a reconnection command may be sent by server 128 at block 425, for example after receipt of a payment at block 410, or simply upon computation of a new usage limit. In some cases, a usage limit sent to utility meter 104 may not actually consume the entire account balance associated with load 116, and therefore it is possible for the usage limit to become exhausted while funds remain in the account balance. In other embodiments, rather than wait at block 550 for a reconnection command, utility meter 104 can instead return to block 510, and continue reporting usage (although the usage may be zero) at intervals set by the performance of block 520. As mentioned earlier, utility meter 104 may also receive a new limit (or any other command) from server 128 while waiting at block 550 or while monitoring and reporting usage at blocks 510-525.

A reconnection command may also be received at block 550, in some embodiments, via generation of the reconnection command at utility meter 104 itself. Some utility meters have emergency credit functionality, whereby additional usage may be activated even after a disconnection (whether the disconnection is initiated by server 128 or utility meter 104). When a reconnection command is received at block 550, the reconnection command will also specify a new usage limit, and utility meter 104 will therefore return to block 505.

In summary, therefore, system 100 provides for a combination of local (by utility meter 104) and remote (by server 128) control of the delivery of a utility to load 116. As will be apparent from the discussion above, various advantages arise from this combination of local and remote control. For example, the implementation of usage limits at utility meter 104 allows utility meter 104 to control utility delivery with little or no delay between usage and control actions (e.g. cutoff), even when network 108 is congested or unavailable. As a further example, the generation of usage limits and the handling of charging processes by server 128 rather than utility meter 104 permits utility meter 104 to be a relatively simple, inexpensive device.

Variations to the systems and methods described herein are contemplated, in addition to the variations already discussed above. In some embodiments the cutoff operations executed by utility meter 104 a blocks 540 and 555 may be more complex than activating cutoff device 216. For example, utility meter 104 or server 128 can store indications of time periods during which cutoff is not permitted (e.g. at night, on weekends). Thus, at block 540 utility meter 104 can be configured to activate cutoff device 216 only if the current time is not within one of the above time periods. Further, server 128 can make a similar determination before sending a cutoff command to utility meter 104.

In a further variation, in addition to entirely cutting off delivery of the utility to load 116, cutoff device 216 can throttle the delivery of the utility (e.g. reducing the available electrical supply current from 16 A to 2 A). Whether delivery is to be throttled or cut off entirely can be specified by server 128, determined by utility meter 104 (e.g. based on time periods similar to those mentioned above), or both. In a still further variation, cutoff device 216 can have more than one cutoff state. For example, cutoff device 216 can be activated in a "disconnect" state, in which utility delivery is interrupted, but a user can restore delivery, or in a "disabled" state, in which utility delivery is interrupted and cannot be restored without an instruction from server 128. Server 128 and utility meter 104 can therefore be configured to employ various thresholds or other conditions to apply each specific cutoff state.

Persons skilled in the art will appreciate that there are yet more alternative implementations and modifications possible for implementing the embodiments, and that the above implementations and examples are only illustrations of one or more embodiments. The scope, therefore, is only to be limited by the claims appended hereto.

We claim:

1. A system, comprising:
a utility meter connected to a data network and having a cutoff device for enabling or disabling delivery of a utility to a load; and
a server connected to the utility meter via the network;
the utility meter configured to:
  receive a usage limit for the utility from the server, and store the usage limit in a memory, the usage limit defining a quantity of the utility;
  measure usage of the utility by the load;
  responsive to determining that the measured usage exceeds the usage limit, activate the cutoff device to disable the delivery of the utility to the load; and
  transmit the measured usage with a request defining a requested further usage limit to the server via the network at configurable intervals;
the server configured to:
  maintain an account balance associated with the load;
  receive the measured usage from the utility meter via the network;
  decrement the account balance based on the measured usage;
  when the account balance is not exhausted, generate a further usage limit based on the account balance, and send the further usage limit to the utility meter, the further usage limit defining a further quantity of the utility;
  wherein the further usage limit is (i) equal to the requested further usage limit when the requested further usage limit can be accommodated by the account balance, and (ii) smaller than the requested further usage limit when the requested further usage limit exceeds the account balance; and
  when the account balance is exhausted, send a command to activate the cutoff device to the utility meter.

2. The system of claim 1, the server further configured to store a rate defining a cost corresponding to a quantity of the utility; the server configured to decrement the account balance based on the measured usage and the rate.

3. The system of claim 2, the server further configured to generate the further usage limit based on the account balance and the rate.

4. The system of claim 1, the server further configured to generate the further usage limit based on the request.

5. The system of claim 4, the server further configured to generate the further usage limit with a quantity of the utility equal to the quantity in the request, when the account balance accommodates the quantity in the request.

6. The system of claim 1, the server further configured to generate the further usage limit by determining a quantity of the utility that will consume substantially the entire account balance.

7. A method in a server having a processor, a memory and a network interface for connecting to a utility meter via a network; the utility meter having a cutoff device for enabling or disabling delivery of a utility to a load, the method comprising:
    maintaining, in the memory, an account balance and a usage limit associated with the load, the usage limit defining a quantity of the utility;
    receiving, at the processor via the network interface, measured usage with a request defining a requested further usage limit from the utility meter via the network;
    decrementing, at the processor, the account balance based on the measured usage;
    when the account balance is not exhausted, generating a further usage limit at the processor, and sending the further usage limit to the utility meter via the network interface, wherein the further usage limit is (i) equal to the requested further usage limit when the requested further usage limit can be accommodated by the account balance, and (ii) smaller than the requested further usage limit when the requested further usage limit exceeds the account balance; and
    when the account balance is exhausted, sending a command to activate the cutoff device to the utility meter via the network interface.

8. The method of claim 7, further comprising:
    storing, in the memory, a rate defining a cost corresponding to a quantity of the utility;
    decrementing, at the processor, the account balance based on the measured usage and the rate.

9. The method of claim 8, further comprising: generating, at the processor, the usage limit based on the account balance and the rate.

10. The method of claim 7, further comprising: generating, at the processor, the usage limit based on the account balance, the rate and the request.

11. The method of claim 10, further comprising: generating, at the processor, the usage limit with a quantity of the utility equal to the quantity in the request, when the account balance accommodates the quantity in the request.

12. The method of claim 7, further comprising: generating, at the processor, the usage limit by determining a quantity of the utility that will consume substantially the entire account balance.

13. A server, comprising:
    a network interface for connecting to a utility meter via a network; the utility meter having a cutoff device for enabling or disabling delivery of a utility to a load;
    a memory storing an account balance and a usage limit associated with the load, the usage limit defining a quantity of the utility; and
    a processor interconnected with the memory and the network interface; the processor configured to:
        receive the measured usage with a request defining a requested further usage limit from the utility meter via the network;
        decrement the account balance based on the measured usage;
        when the account balance is not exhausted, generate a further usage limit, and send the usage limit to the utility meter, the further usage limit defining a further quantity of the utility, wherein the further usage limit is (i) equal to the requested further usage limit when the requested further usage limit can be accommodated by the account balance, and (ii) smaller than the requested further usage limit when the requested further usage limit exceeds the account balance; and
        when the account balance is exhausted, send a command to activate the cutoff device to the utility meter.

14. The server of claim 13, the memory further storing a rate defining a cost corresponding to a quantity of the utility; the processor further configured to decrement the account balance based on the measured usage and the rate.

15. The server of claim 14, the processor further configured to generate the usage limit based on the account balance and the rate.

16. The server of claim 13, the processor further configured to generate the usage limit based on the request.

17. The server of claim 16, the processor further configured to generate the usage limit with a quantity of the utility equal to the quantity in the request, when the account balance accommodates the quantity in the request.

18. The server of claim 13, the processor further configured to generate the usage limit by determining a quantity of the utility that will consume substantially the entire account balance.

* * * * *